United States Patent
Doran, Jr.

(10) Patent No.: US 7,293,648 B2
(45) Date of Patent: Nov. 13, 2007

(54) EQUIPMENT COVER AND METHOD OF USE

(75) Inventor: William Yoerg Doran, Jr., Edwards, CO (US)

(73) Assignee: Evergreen Innovation Partners I, LP, Evergreen, CO (US)

( * ) Notice: Subject to any disclaimer, the term of this patent is extended or adjusted under 35 U.S.C. 154(b) by 393 days.

(21) Appl. No.: 10/983,191

(22) Filed: Nov. 5, 2004

(65) Prior Publication Data

US 2006/0096874 A1    May 11, 2006

(51) Int. Cl.
B65D 85/38    (2006.01)

(52) U.S. Cl. .................... 206/316.2; 206/205

(58) Field of Classification Search .. 206/316.1–316.3, 206/205, 207, 578; 150/154; 219/201, 385; 396/429, 535, 536, 661; 53/441, 449, 467, 53/473, 476
See application file for complete search history.

(56) References Cited

U.S. PATENT DOCUMENTS

| | | | |
|---|---|---|---|
| 4,176,701 A | 12/1979 | Welgan | |
| 4,751,950 A | 6/1988 | Bock | |
| 4,923,060 A | 5/1990 | Breslau | |
| 4,927,017 A | 5/1990 | Easter | |
| 4,982,841 A | 1/1991 | Goedecke | |
| 5,101,974 A | 4/1992 | Alwitt | |
| 5,173,585 A | 12/1992 | Dokken | |
| 5,337,891 A | 8/1994 | Toth | |
| 6,305,537 B1 | 10/2001 | Jaffe | |
| 6,774,296 B2 * | 8/2004 | Aesch | 84/453 |
| 2004/0251151 A1 * | 12/2004 | Doran, Jr. | 206/316.1 |

OTHER PUBLICATIONS

Aqua Tech Sport Shields: Sep. 21, 2004; pp. 1-5; WorldWideWeb @: http://www.aquatech.com.au/products/sprotshields/sportshields.htm.
"Polar Bear." PortaBrace. 1 page. Taken from 2002 archives of www.portabrace.com.
"Polar Bear." PortaBrace. 2 pages. Taken from 2004 archives of www.portabrace.com
"Polar Bear: Details on Polar Bear Camera Case." PortaBrace. 2 pages. Taken from 2004 archives of www.portabrace.com.
"Polar Mitten (Heated camera case)." 1 page. PortaBrace. Taken from 2003 archives of www.portabrace.com.
"Polar Mitten (Heated camera case)." 1 page. PortaBrace. Taken from 2004 archives of www.portabrace.com.

(Continued)

*Primary Examiner*—Luan K. Bui
(74) *Attorney, Agent, or Firm*—Perkins Coie LLP (57) ABSTRACT

An insulated equipment cover combined with a glove-like extension for use with various types of equipment enables use in cold temperatures and adverse weather elements. The equipment cover generally conforms to the shape of the equipment and is made of flexible insulated material. The equipment cover provides sufficient room for an operator's hand to operate the equipment within the interior of the equipment cover. The equipment cover also extends down to the operator's wrist and a portion of the forearm, providing insulation and protection from adverse weather elements. The equipment cover is formed from a custom sewn sheet of insulated material with one or more elastic or cinching openings to allow access to, or for parts of the equipment to extend out of, the equipment cover. Various equipment specific openings allow the operator to view and access equipment controls and displays. Interior pockets may hold chemical heat packs.

16 Claims, 5 Drawing Sheets

OTHER PUBLICATIONS

"Porta-Brace Photo Search: Camera Cases and Related Products." PortaBrace. 3 pages. Taken from 2002 archives of www.portabrace.com.

"Travel Boot (requires Shoulder Case)." 1 page. PortaBrace. Taken from 2003 archives of www.portabrace.com.

* cited by examiner

EQUIPMENT COVER AND METHOD OF USE

FIELD OF THE INVENTION

This invention relates to the use of equipment, and more particularly, to an equipment cover and method of using the same when using equipment in cold temperature conditions.

BACKGROUND OF THE INVENTION

The use of certain equipment in cold temperatures is problematic in that the electrical, mechanical and electromagnetic components become sluggish and may even seize up. Such equipment includes, but is not limited to, still photography and video cameras, surveying equipment, weather monitoring equipment, portable radio transmitter/receivers, hunting equipment, etc. In addition, for battery powered equipment, cold temperatures cause batteries to drain very quickly and make them less efficient and may require their frequent replacement. Equipment operators have no choice but to carry an inordinate amount of extra weight for backup battery power. During the time it takes to change the batteries, the equipment is not available for use, which may result in the loss of data capture. Furthermore, the equipment operator is challenged in cold temperatures to operate and make adjustments to the equipment. For some equipment, one hand may be protected by wearing a glove, but the other hand may have to be exposed to the cold temperatures in order to give the equipment operator the dexterity and tactile feel necessary to operate and make equipment adjustments required for a particular use. For some equipment, both hands may need to be exposed. The equipment operator must endure the cold temperatures on his or her bare hand or hands (which in extreme cold temperatures may not be a viable option), or attempt to operate and make equipment adjustments while wearing bulky gloves, usually with less than satisfactory results due to the loss of dexterity and tactile feel. Other adverse weather elements on top of cold temperatures, such as rain, snow, sleet, hail, ice, etc. serve to exacerbate the problem.

Under these conditions, it has been known in the past, for example, for a photographer to hold a camera with his or her bare hand inside his or her coat when not in use to keep both the camera and his or her hand warm and to protect both from the above mentioned adverse weather elements. However, this may cause water condensation to occur on the lens and viewfinder glass, causing additional problems for the photographer. It has also been known in the past to use rubber bands or other securing means to secure portable temporary heating elements to certain equipment in an effort to keep the equipment warm. These attempts have met with little success because they provide only a temporary solution to the problem of equipment performance in cold temperatures, and they completely fail to solve the problem of keeping the equipment operator's hand or hands warm while operating or making adjustments to the equipment and fail to protect the equipment from the adverse weather elements. Also, the equipment operator may not be ready to operate the equipment timely while his or her hand and the equipment are being held inside their jacket. Such would be the case, for example, for a photographer who needs to take an action shot, and by the time the camera is removed from his or her jacket and aimed and ready to shoot, the action scene or event may by then be over, or have passed by, and the opportunity to take the shot has been missed.

It is known in the art to provide various types of cases and covers for equipment for specialized purposes. For example, U.S. Pat. No. 4,751,950, and a commercial product (patent pending), both describe a camera and lens protector for use during rain or other adverse weather elements. While such devices do provide some means of protection from water and other adverse weather elements, they are not designed for maintaining or ensuring the warmth of the camera (including the camera components and batteries), nor do they maintain or ensure the warmth of a photographer's hand. These considerations take on special significance in the case of operating equipment outdoors in cold temperature conditions, or in any other cold environment, such as an underground cave or mine, or unheated building in winter, for any extended length of time.

It is also known in the art to provide a heating element for a camera. For example, U.S. Pat. No. 5,173,585 describes a camera heating jacket that enables the photographer to "warm up" the camera with the electrically heated jacket prior to use. This invention requires the photographer to be near an electrical outlet prior to taking photographs, and is only a temporary solution. Once the heating jacket cools in the cold temperatures, the jacket is generally useless. In addition, this solution fails to address the problem of keeping the photographer's bare hand warm while at the same time enabling easy adjustment of the camera's settings.

DETAILED DESCRIPTION OF THE INVENTION

Figure 1:
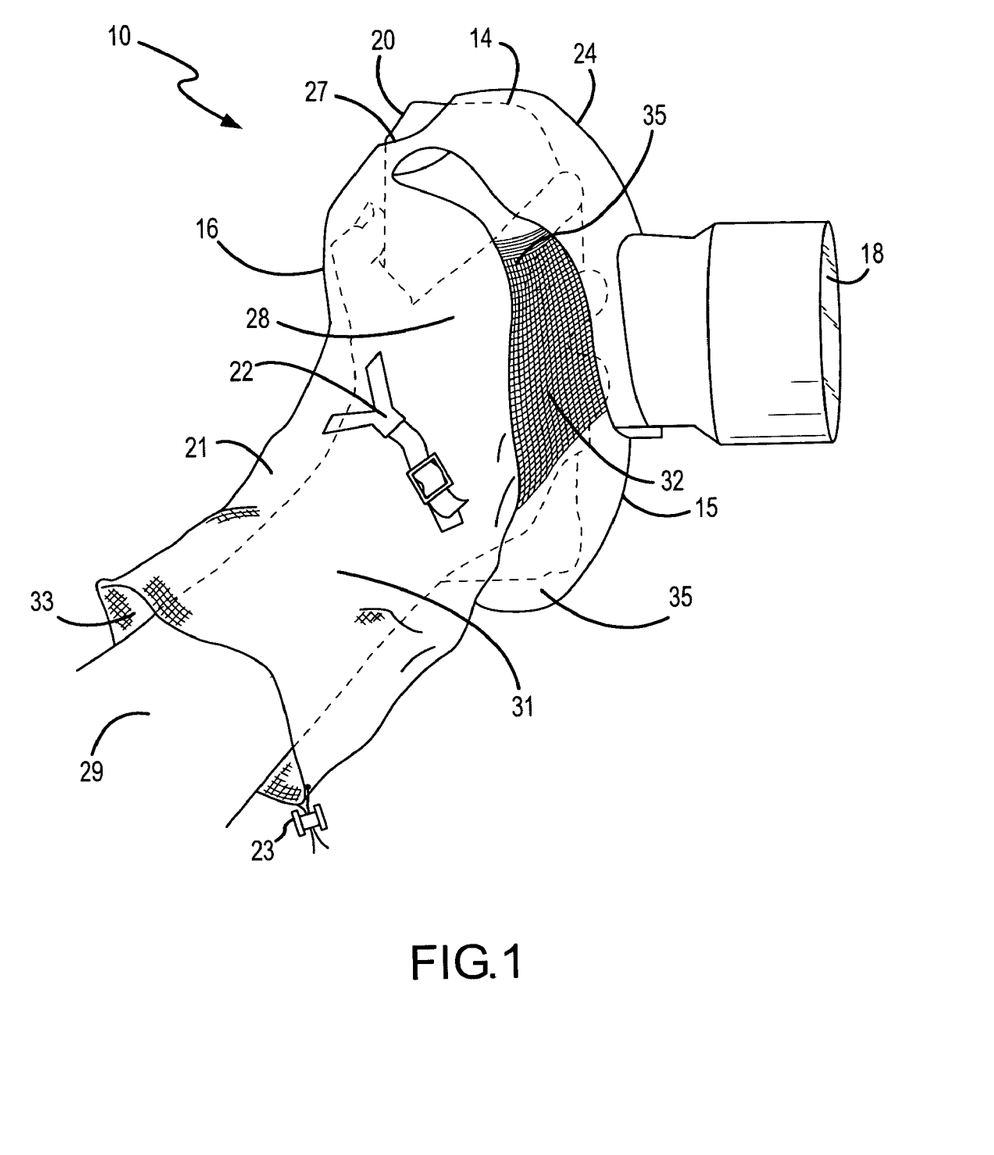
FIG. 1 shows a level right side perspective view of a camera cover in an embodiment of the present invention shown in protective position over a camera body and larger format lens assembly with the right hand and arm of a photographer shown in phantom.
Figure 2:
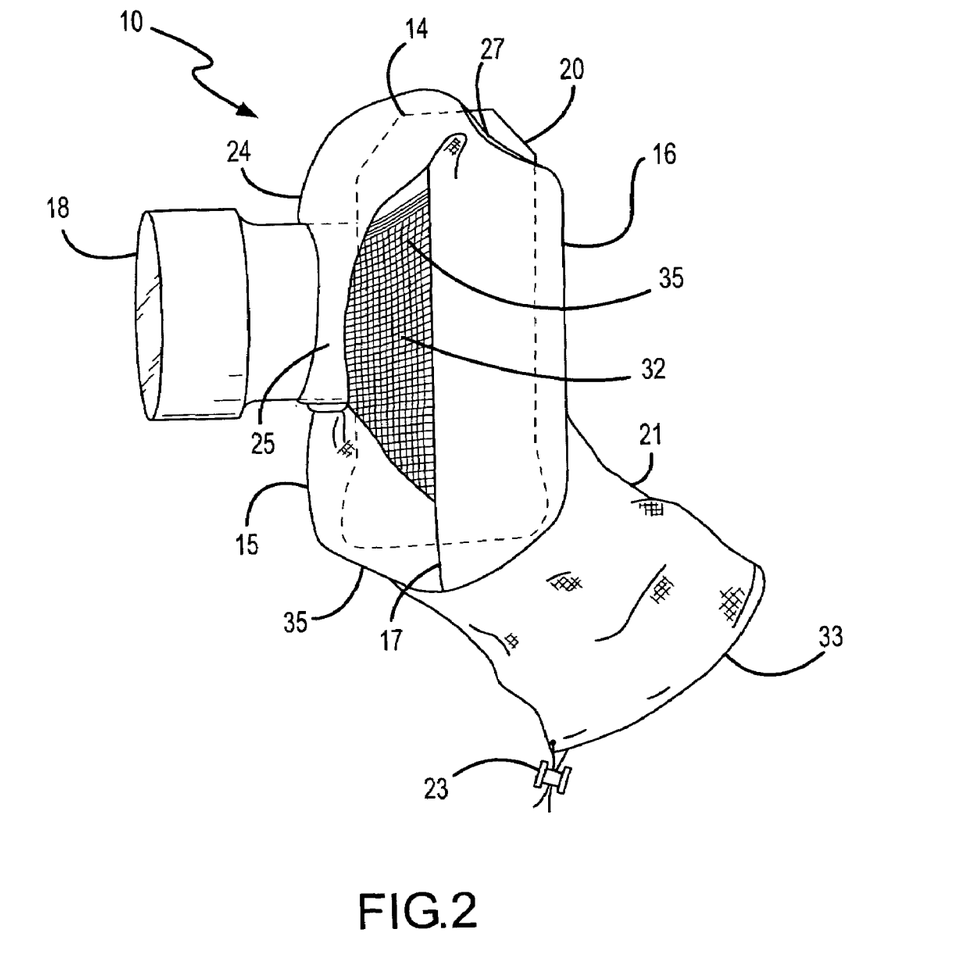
FIG. 2 shows a level left side perspective view of a camera cover in an embodiment of the present invention shown in protective disposition over a camera body and lens opposite that illustrated in FIG. 1.

Referring now to the Figures, in which like reference numerals and names refer to structurally and/or functionally similar elements thereof, FIGS. 1-5 show various views a camera cover in an embodiment of the present invention. Camera Cover 10 is designed to protect professional camera equipment, and the photographer's hand, wrist, and partial forearm, from cold temperatures and adverse weather elements. Camera Cover 10 provides both insulation and protection, and is made of a flexible weatherproof and waterproof material having a firm foam core having a semi-rigid form fitting effect. For example, Camera Cover 10 may be made of a heavy duty waterproof and weather proof nylon material. The foam core may also be made of neoprene. To obtain a specific R-value for Camera Cover 10, differing grades of nylon, and differing thicknesses of foam core may be selected. Camera Cover 10 has a unique "glove-like" look in its appearance. Viewfinder Opening 27, Camera Body Opening 38, and Camera Lens Opening 39 provide convenient means for placing the camera equipment within Camera Cover 10, and Elastic Opening 33 allows User Hand 28 (shown in phantom) the necessary hands-on access to camera settings, functions, and controls. As shown in FIG. 1, the camera equipment includes a Camera Body 14 (shown in phantom) having a rearmost Viewfinder 36 adjacent to and just below the "hot shoe" Flash Attachment Point 20, and an elongated, larger size, forwardly extending Camera Lens 18 coupled to Camera Body 14. Camera Cover 10 is made of flexible material and is cut out into several pieces and sewn together to match the general shape of Camera Body 14 with an extension down to the User Wrist 31 and User Forearm 29, enabling the photographer to insert his or her hand into the extension and control the camera equipment without User Hand 28 being exposed to cold temperatures.

For the purposes of description, Camera Cover 10 will be described as including a Forward End 15, a Left Side 17, a Rearward End 16 combined with a Top Cover 24 and Securing Flaps 25 to secure Top Cover 24, and a Right Side 21, a "glove like" extension covering User Hand 28 and User Wrist 31 (shown in phantom), and User Forearm 29 (shown partially in phantom). Right Side 21 may be of varying lengths to cover more or less of User Forearm 29. Right Side 21 also contains an adjustable Securing Strap 22 for cinching around User Wrist 31, and Elastic Opening 33 with Adjustable Toggle 23 which can be used to tighten Elastic Opening 33 around User Forearm 29. Both Securing Strap 22 and Adjustable Toggle 23 serve to prevent the loss of heat from within Camera Cover 10 to the outside environment.

Figure 4:
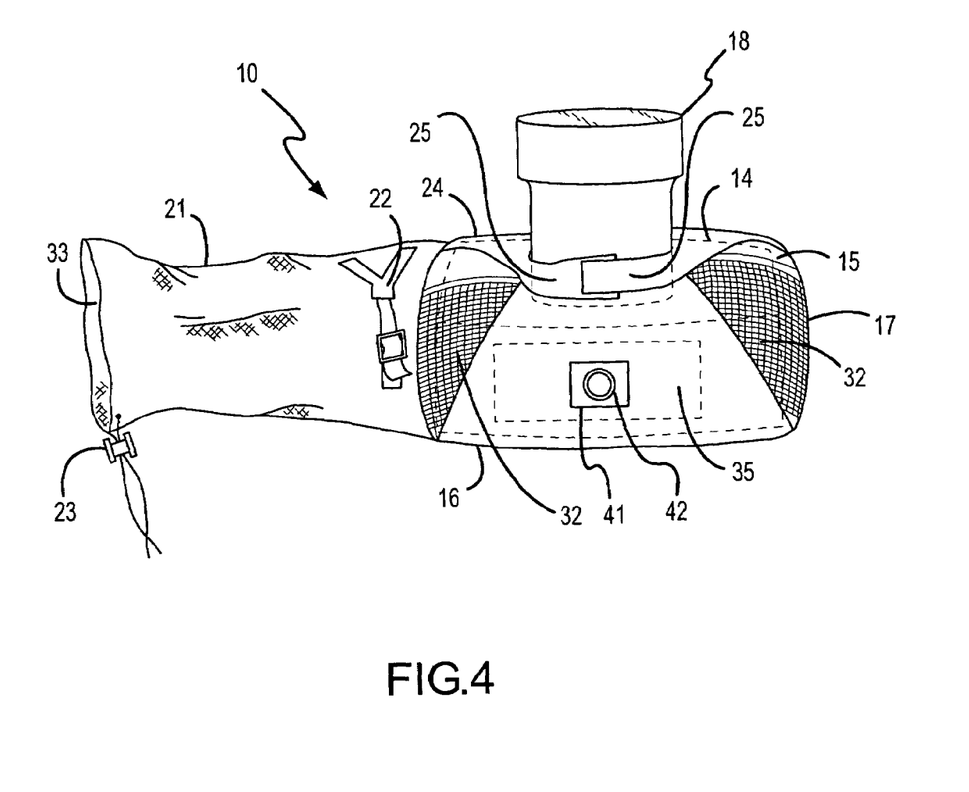
FIG. 4 shows a bottom view of a camera cover in an embodiment of the present invention in the protective position with a camera body and lens as in FIGS. 1, 2 and 3.
Figure 5:
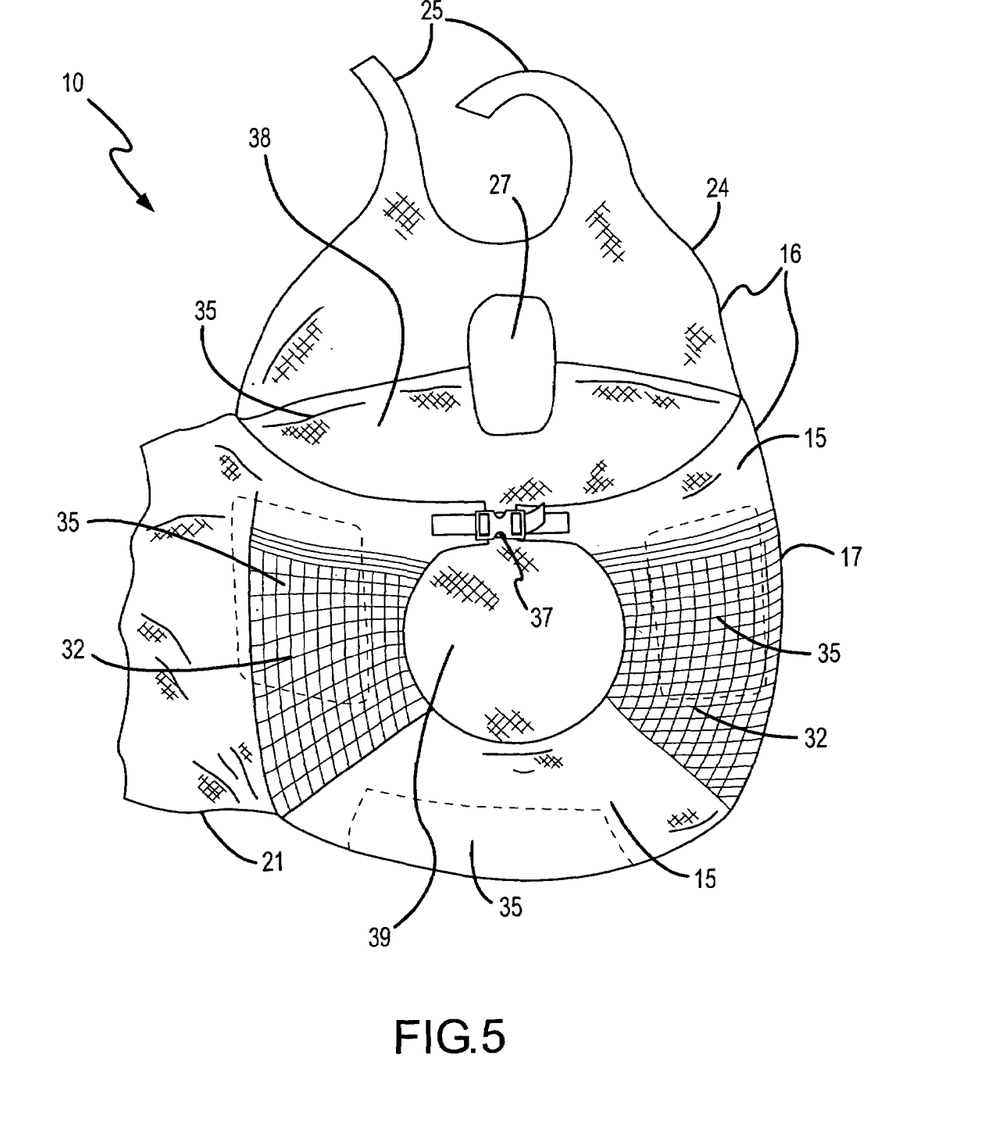
FIG. 5 shows a partial perspective front view of a camera cover in an embodiment of the present invention without camera body and lens illustrating a portion of the interior.

As shown in FIG. 5, the Rearward End 16 is combined with a Top Cover 24 along with Securing Flaps 25 that come over the top of Camera Body 14 and wrap around and underneath Camera Lens 18. The view in FIG. 4 particularly illustrates how the Securing Flaps 25 of Top Cover 24 go over the front, wrap around and underneath Camera Lens 18, and secures on the underside of Camera Lens 18. Securing Flaps 25 are adjustable and fasten to each other. In one embodiment of the invention, a Velcro® type fastener is used for Securing Flaps 25. Snaps, a buckle, or other fastening device may also be used to adjustably fasten the Securing Flaps 25 together. Additionally, a Tripod Opening 41 may be provided to allow access to Threaded Opening 42 in Camera Body 14 for attachment to a tripod.

An adjustable Lens Opening Fastener 37 is also shown in FIG. 5. Lens Opening Fastener 37 allows various sizes of camera lenses to be inserted through Camera Lens Opening 39 and then closed around the circumference of Camera Lens 18. Lens Opening Fastener 37 may be a Velcro® type fastener, a buckle, or other fastening device. When open, Lens Opening Fastener 37 allows easy access for placing Camera Body 14 and Camera Lens 18 into position within Camera Cover 10. Lens Opening Fastener 37, along with Top Cover 24 and Securing Flaps 25, closes off the interior of Camera Cover 10, protecting Camera Body 14 and User Hand 28 from the elements, and provides an insulated and enclosed housing which retains heat and protects the camera equipment.

Figure 3:
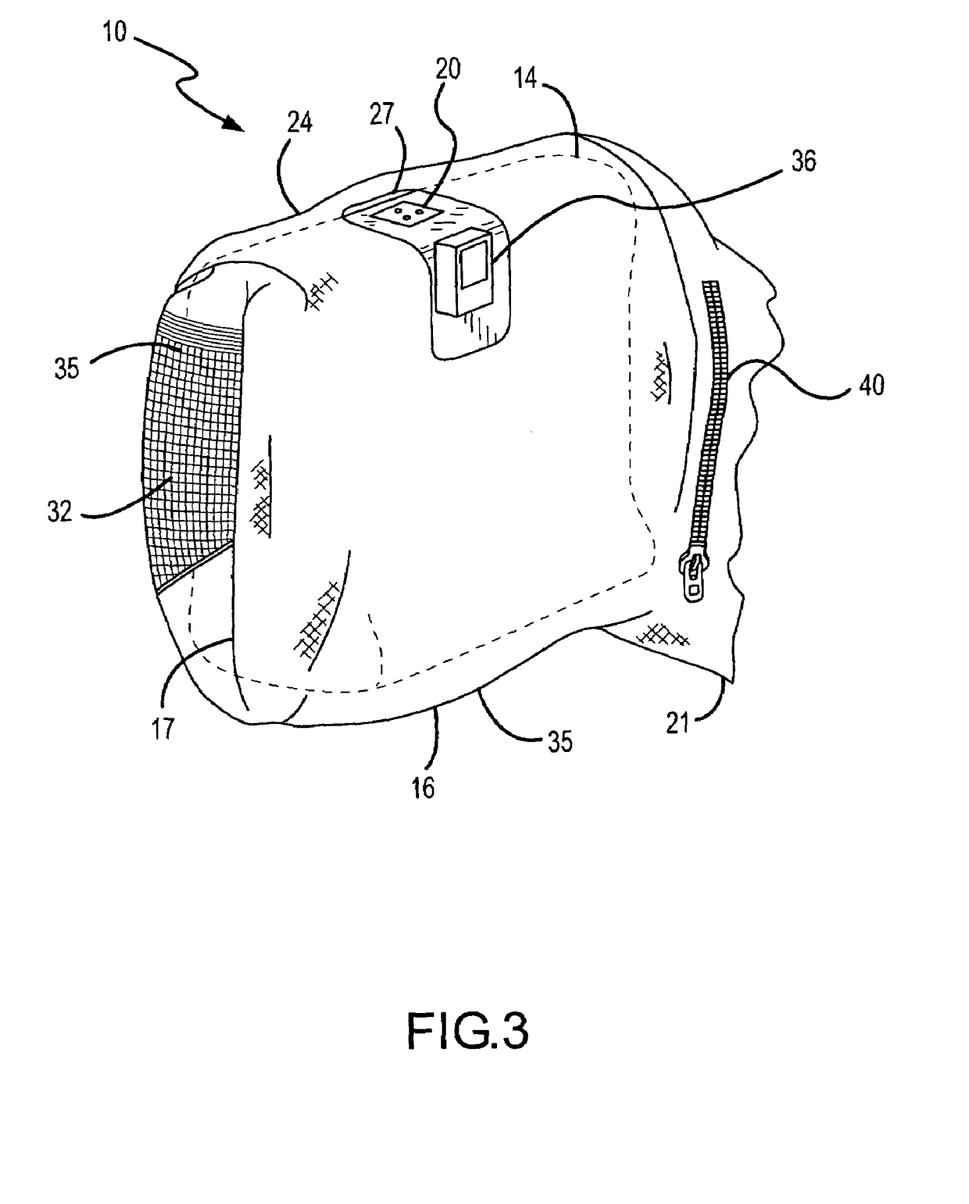
FIG. 3 shows a partial perspective view of the rear and left side of a camera cover in an embodiment of the present invention with the protected camera body and lens as in FIGS. 1 and 2 and illustrating the way in which the camera cover provides an unobstructed view of the camera viewfinder and full access to the camera flash attachment point.

As best shown in FIG. 3, in securing Top Cover 24 and Securing Flaps 25 and Lens Opening Fastener 37, the form fitting design of Camera Cover 10 secures firmly around Camera Body 14, Viewfinder 36, and Flash Attachment Point 20. Viewfinder Opening 27 provides an unobstructed view of Viewfinder 36 and full access to Flash Attachment Point 20. Alternatively, there may be two separate openings to allow access to Viewfinder 36 and to Flash Attachment Point 20. Viewfinder Opening 27 may have a see-through plastic covering which enables the photographer to view through Viewfinder 36 yet still protect the interior of Camera Cover 10 from the outside elements. A portion of the plastic covering may be partially removed in order to attach a flash device (not shown) at Flash Attachment Point 20 of Camera Body 14. Zippered Vent 40, shown zipped shut, is located on Right Side 21. Zippered Vent 40 may be opened should the temperature inside Camera Cover 10 become too warm, allowing heat to escape, and cooler air to enter into Camera Cover 10. More than one Zippered Vent 40 may be positioned in various locations on Camera Cover 10, and may utilize other open and close mechanisms besides a zipper, such as a Velcro® type fastener.

Depending upon the particular make and model of camera, there may be other openings provided in Camera Cover 10, with or without see-through coverings, to enable the photographer view or access different portions of the camera for different reasons. Thus, the present invention is highly customizable for each particular camera.

Referring again to FIGS. 1 and 2, Camera Body 14 is enclosed within Camera Cover 10, allowing full contact of User Hand 28 with Camera Body 14 for making use of camera settings, functions, and controls without interference. The User Hand 28 and User Wrist 31 are protected by Right Side 21 in a "glove like" fashion, covering User Hand 28, User Wrist 31 and a portion of User Forearm 29. Right Side 21 also has an adjustable Securing Strap 22 (see FIGS. 1 and 4) which can be cinched tight to secure Camera Cover 10 to User Forearm 29. Elastic Opening 33 with Adjustable Toggle 23 further secures Camera Cover 10 after the User Hand 28 and User Wrist 31 are situated inside, thus retaining natural body heat and further protecting the User Hand 28 and User Wrist 31 and Camera Body 14 while working in cold temperatures.

Camera Cover 10 provides numerous Interior Pockets 35 as seen most clearly in FIGS. 4 and 5 (shown in phantom), to be used with standard, off-the-shelf chemical heat packs, such as Hot Hands™, to augment the insulating properties of Camera Cover 10. Other types of heat packs may also be used. Interior Pockets 35 are situated throughout the interior side of Camera Cover 10 allowing a photographer to decide what level of heat augmentation they desire. The colder the temperature, more Interior Pockets 35 may have heat packs inserted therein. Camera Cover 10 is designed to be used independently of any ground-based heat source, such as current from an electric outlet, allowing the photographer to work in cold temperatures in remote locations for long periods of time. Camera Cover 10 will retain heat within its confined area for several hours when used in conjunction with chemical heat packs, and will not only provide comfort to the photographer but will also prevent the camera workings from becoming cold and "sluggish". Equally important, Camera Cover 10 will also prolong the life expectancy of batteries that would normally drain quickly in cold temperatures, thus allowing longer shooting capability and providing more time for the photographer to complete an assignment. Further, Exterior Pockets 32 are provided for extra storage of various items. Exterior Pockets 32 are made of a weatherproof mesh.

Thus it can be seen that Camera Cover 10 enables photographers to work in remote locations for long periods of time in cold environments. Although Camera Cover 10 is designed primarily for use with 35 mm, digital, and larger format still cameras, the Camera Cover 10 could also be used with smaller "point and shoot" cameras and larger video cameras or the like by adjusting and sizing the construction materials accordingly. Camera Cover 10 ensures that the camera equipment performs at the expected performance level by insulating the is camera from cold temperatures and provides comfort and warmth to the photographer while taking photographs in cold environments. Camera Cover 10 overcomes the limitations of prior inventions, enabling the photographer to be fully mobile in the remotest of places with warming power derived from chemical warming packs and insulation capabilities for extended shoots over several hours. Camera Cover 10 enables the photographer to have hands-on access to the camera functions and dials while at the same time protects the camera equipment and photographer from the adverse weather elements of rain, snow, sleet, hail, ice, and cold temperatures.

Having described an embodiment of the present invention, it will be understood by those skilled in the art that many changes in construction and widely differing embodiments and applications of the invention will suggest themselves without departing from the scope of the present invention. For other types of equipment, including but not limited to, video cameras, surveying equipment, weather monitoring equipment, portable radio transmitter/receivers, hunting equipment, etc., openings for both hands may be incorporated into the insulated equipment cover instead of just one opening for one hand of the equipment operator. Other openings in various locations may be provided in the insulated equipment cover for viewing controls, displays, readouts, knobs, dials, switches, electrical connections, etc. as required by the particular piece of equipment the insulated equipment cover is designed to protect.

What is claimed is:

1. A camera cover for a camera comprising:
    a flexible sheet of insulated material having a forward end, rearward end, a first side, a second side, a first opening for receiving the camera, and a top cover for folding over said first opening and enclosing the camera;
    a second opening in said forward end to enable a camera lens to protrude from the camera cover through said second opening;
    a third opening in said second side for inserting a hand into the camera cover, said second side extending outward to cover said hand, a wrist, and a partial forearm of a user; and
    a first securing flap and a second securing flap, wherein when said top cover folds over said first opening, said first and second securing flaps wrap around opposite sides of said camera lens and adjustably fasten together;
    wherein the camera cover insulates the camera and said hand, said wrist, and said partial forearm of said user from cold temperatures while permitting normal operation of the camera by said user.

2. The camera cover according to claim 1 wherein said flexible sheet is made from a flexible weatherproof and waterproof material having a firm foam core having a semi-rigid form fitting effect.

3. The camera cover according to claim 1 further comprising:
    a fourth opening for a viewfinder and a flash attachment point of the camera, wherein said fourth opening provides an unobstructed view of said viewfinder and an unobstructed access to said flash attachment point.

4. The camera cover according to claim 3 wherein said fourth opening further comprises:
    a see-through covering over said fourth opening, wherein said see-through covering protects said viewfinder and said flash attachment point from outside elements.

5. The camera cover according to claim 1 further comprising:
    a fourth opening for a tripod attachment of the camera, wherein said fourth opening provides an unobstructed access to a threaded opening of the camera for attaching a tripod to the camera.

6. The camera cover according to claim 1 further comprising:
    a securing strap located on said second side, wherein said securing strap is cinched to secure said second side to said wrist of said user.

7. The camera cover according to claim 1 further comprising:
    an adjustable toggle located on said third opening, wherein said adjustable toggle is tightened to secure said second side to said forearm of said user.

8. The camera cover according to claim 1 further comprising:
    an adjustable fastener located on said second opening, wherein said adjustable fastener is closed around said camera lens to secure said forward end having said second opening around said camera lens.

9. A method for using a camera in cold temperatures, the method comprising the steps of:
    (a) inserting the camera into a first opening of a camera cover made from a flexible sheet of insulated material;
    (b) protruding a camera lens through a second opening of said camera cover;
    (c) inserting a hand of a user into a third opening in a side of said camera cover, wherein said hand, a wrist, and a partial forearm of said user are covered-by said side of said camera cover and further wherein said camera cover insulates the camera and said hand, said wrist, and said partial forearm of said user from cold temperatures while permitting normal operation of the camera by said user;
    wherein the step of inserting the camera includes folding a top cover of said camera cover over said first opening; wrapping a first securing flap of said top cover around a first side of said camera lens;
    wrapping a second securing flap of said top cover around an opposite side of said camera lens; and
    fastening said first securing flap to said second securing flap.

10. A method according to claim 9 further comprising the step of:
    viewing a viewfinder of said camera through a fourth opening of said camera cover, wherein said fourth opening provides an unobstructed view of said viewfinder.

11. A method according to claim 10 further comprising the step of:
    accessing a flash attachment point of the camera through said fourth opening of said camera cover, wherein said fourth opening provides an unobstructed access to said flash attachment point.

12. A method according to claim 11 further comprising the step of:
    covering said fourth opening with a see-through covering, wherein said see-through covering protects said viewfinder and said flash attachment point from outside elements.

13. A method according to claim 9 further comprising the step of:

accessing a threaded opening of the camera through a fourth opening of said camera cover, wherein said fourth opening provides an unobstructed access to said threaded opening for attaching a tripod to the camera.

14. A method according to claim 9 wherein step (b) further comprises the step of:

closing an adjustable fastener located on said second opening to secure said second opening around said camera lens.

15. A method according to claim 9 wherein step (c) further comprises the step of:

cinching a securing strap located on said side of said securing cover to secure said side to said wrist of said user.

16. A method according to claim 9 wherein step (c) further comprises the step of:

tightening an adjustable toggle located on said third opening to secure said side to said forearm of said user.

* * * * *